(12) United States Patent
Farant et al.

(10) Patent No.: US 7,316,731 B2
(45) Date of Patent: Jan. 8, 2008

(54) ADSORPTION OF CONTAMINANTS FROM GASEOUS STREAM AND IN SITU REGENERATION OF SORBENT

(75) Inventors: Jean-Pierre Farant, Cantley (CA); Gerald Desbiens, Varennes (CA)

(73) Assignee: McGill University, Montreal, Quebec (CA)

(*) Notice: Subject to any disclaimer, the term of this patent is extended or adjusted under 35 U.S.C. 154(b) by 259 days.

(21) Appl. No.: 10/499,856

(22) PCT Filed: Dec. 11, 2002

(86) PCT No.: PCT/CA02/01915

§ 371 (c)(1),
(2), (4) Date: Dec. 2, 2004

(87) PCT Pub. No.: WO03/051490

PCT Pub. Date: Jun. 26, 2003

(65) Prior Publication Data

US 2006/0096454 A1    May 11, 2006

Related U.S. Application Data

(60) Provisional application No. 60/340,874, filed on Dec. 19, 2001.

(51) Int. Cl.
*B01D 53/04* (2006.01)
*B01J 20/34* (2006.01)

(52) U.S. Cl. .................. 95/106; 96/143; 96/146; 96/149

(58) Field of Classification Search .............. 95/95, 95/106, 148, 901; 96/126, 143, 146, 130, 96/149, 150
See application file for complete search history.

(56) References Cited

U.S. PATENT DOCUMENTS

| 4,737,164 A | 4/1988 | Sarkkinen |
| 5,187,131 A | 2/1993 | Tiggelbeck et al. |
| 5,827,355 A * | 10/1998 | Wilson et al. ............ 95/114 |
| 5,912,423 A | 6/1999 | Doughty et al. |
| 5,980,612 A | 11/1999 | Kelly |
| 6,107,612 A | 8/2000 | Farant |
| 6,197,097 B1 * | 3/2001 | Ertl et al. ............... 96/143 |
| 6,364,936 B1 | 4/2002 | Rood et al. |

(Continued)

FOREIGN PATENT DOCUMENTS

DE    41 04 513    11/1996

(Continued)

*Primary Examiner*—Frank M. Lawrence
(74) *Attorney, Agent, or Firm*—Fay Sharpe LLP

(57) ABSTRACT

Contaminant is removed from a gaseous stream, especially an air stream bearing the contaminant, by adsorption on a sorbent which is a resiliently compressible, electrically conductive, activated carbon cloth material, leaving a gaseous stream liberated of the contaminant; the carbon cloth material loaded with the contaminant may be regenerated by desorption of the contaminant; the carbon cloth material loaded with contaminant is housed in a vacuum and electric current is passed through the carbon cloth material generating heat in the cloth material which is effective to desorb the contaminant which is exhausted under vacuum; the level of heat generated is varied as required, typically to develop a temperature of 250 to 500° C. in the cloth material, by varying the compression of the cloth material; desorption is typically achieved in about 30 minutes at a vacuum of 10 Torr or less.

16 Claims, 6 Drawing Sheets

U.S. PATENT DOCUMENTS 6,454,834 B1 * 9/2002 Livingstone et al. .......... 95/11
6,773,491 B1 * 8/2004 Bohl ........................... 96/130

FOREIGN PATENT DOCUMENTS

| DE | 198 28 593 | | 10/1999 |
| DE | 19828593 A1 | * | 10/1999 |
| DE | 198 23 562 | | 12/1999 |
| FR | 2 659 869 | | 3/1990 |
| FR | 9003923 | * | 9/1991 |
| WO | WO 94/03270 | | 2/1994 |

* cited by examiner

ADSORPTION OF CONTAMINANTS FROM GASEOUS STREAM AND IN SITU REGENERATION OF SORBENT

This application claims the priority benefit of PCT/CA02/01915, filed Dec. 11, 2002, which claims the priority benefit of U.S. provisional application Ser. No. 60/340,874, filed Dec. 19, 2001, which is incorporated herein by reference.

TECHNICAL FIELD

This invention relates to a method and apparatus or device for removing a contaminant from a gaseous stream bearing the contaminant; the invention also relates to a method and apparatus or device for desorbing a contaminant from a carbon cloth material loaded with adsorbed contaminant.

More especially, the invention relates to the removal of gaseous contaminants from an air stream by an activated carbon cloth sorbent and the subsequent "in-situ" regeneration of the carbon cloth by the direct application of an electric current while the electro thermally heated carbon cloth is maintained under vacuum and the concomitant collection of the contaminants or their thermal degradation products from the evacuated air for recovery or disposal. This invention is well suited for the purification of air in enclosed spaces such as aircraft cabins, submarines, vehicles, buildings, private residences and personal air respirators.

BACKGROUND ART

Activated carbon is widely used today as a filtration medium in industry and elsewhere for the removal of gaseous contaminants from gaseous and liquid streams where they constitute less than 1% of the fluid stream. The demand for this material is estimated at 220,000 metric tonnes per year and increasing at the rate of 5.4% per annum through 2002. This is due, in part, to increases in the output of chemical processes and more stringent environmental regulations worldwide. For instance, the environmental Protection Agency (EPA) has lowered emissions standards for several environmental pollutants. It should be noted that the emissions of volatile organic contaminants in the U.S.A. in 1998 totaled $1.62 \times 10^7$ Kg and solvent utilization accounted for 30% of these emissions.

In addition, the occupants of office buildings, the residents of private homes and institutions, the passengers in commercial aircrafts, trains and vehicles are increasingly concerned about the quality of the air they breathe. These concerns have become more acute with the implementation of energy conservation measures in these micro environments, and the increased usage of outgasing synthetic materials. This has led to an increased interest in ventilation systems capable of controlling the presence of gaseous contaminants in breathing air. Such systems invariably make use of activated carbon to control these pollutants.

Most of the activated carbon used today for the removal of gaseous contaminants from air streams at concentrations <1% is either granulated or pelletized activated carbon or powdered activated carbon (PAC) usually placed in trays. The contaminated air stream is routed through a bed of activated carbon which adsorbs the gaseous contaminants. The purified air stream is either recycled or discharged to the atmosphere. Inherent problems associated with such systems include high pressure drops and the periodic replacement of the spent carbon, a labor intensive, potentially hazardous and costly procedure. Alternatively, carbon can be incorporated in a matrix or bonded to fiber and shaped as panels, blocks or slabs as described in (WO 94/03270). Although this addresses the problem of high pressure drop across the filtration medium, it leads to a decrease in adsorptive capacity of the bonded carbon and the need for periodic replacement remains.

Activated carbon is also available as activated carbon cloth both woven or knitted, and as a felt. It can be used to make very thin carbon beds having very low pressure drops and with an adsorptive capacity equivalent to deeper granular carbon beds. It is ideally suited to air purification. However, as for the other forms, it must periodically be replaced, and the time between replacements can be comparatively short.

The spent carbon, in all its forms, is either regenerated or replaced when its effectiveness falls below an acceptable value. Replacement with virgin activated carbon is costly and laborious. Movement of the spent carbon off site for regeneration incurs transportation and labor costs and degradation of the medium. The process of regeneration of the adsorptive capacity of the spent carbon invariably involves the heating of the carbon beds. This heat is usually supplied externally by the use of hot air or steam, or by placing hot elements in the carbon medium (U.S. Pat. No. 5,187,131). The regeneration gases burn the carbon medium with a concomitant loss in both the amount of active carbon and the adsorptive capacity. Similar procedures are available for on-site regeneration of spent carbon.

Regeneration of spent carbon by means of vacuum procedures have been largely ineffective to date, because adsorbate volatilization requires thermal energy and vacuum desorption has a chilling effect on the carbon which cannot be offset because the vacuum environment is known to be a very efficient thermal isolator. Hence, for all available processes to date, heat energy cannot be added to the chilled carbon during vacuum adsorption. At best, the process requires an inordinate amount of time to achieve acceptable regeneration.

In general, for all the aforementioned regeneration procedures, the regenerated activated carbon never attains its original adsorptive capacity because there is a residual adsorbate which resists removal. This is especially common with "in-situ" steam regenerated activated carbon. The result is that eventually the regenerated carbon does not satisfy contaminant removal requirements, and must be replaced.

It is known in the art that activated carbon is capable of conducting electricity. The resistance properties of this material are such that useful heat can be generated in this manner (U.S. Pat. No. 6,107,612). Attempts have been made to generate the heat required for regeneration of spent carbon by making use of this property of carbon, (DE 4104513). However, only limited successes have been achieved with this procedure when applied to granulated/pelletized/powdered carbon, because of non-uniform heating patterns, hot spots and short circuits.

Better results have been obtained by passing an electric current through the carbon cloth thus generating the heat required for desorption within the sorbent medium itself where the thermodynamics of the adsorption and desorption processes apply (U.S. Pat. No. 5,912,423) This method is inherently more thermally efficient than prior art methods. However, the method requires that a purge stream of air or inert gaseous be used to convey the desorbed contaminants away from the cloth. The use of air is not recommended since it invariably leads to significant loss of carbon over time by oxidation; and the method requires the use of large volumes of inert gaseous during the regeneration phase which may take three hours or more depending on loading and adsorbate characteristics. This method also requires that technically sophisticated means, usually cryogenic, be used to remove the contaminants from the large volume of inert gases used.

DISCLOSURE OF THE INVENTION

It is the object of the present invention to provide means and a method for removing gaseous contaminants from a gaseous stream, especially an air stream, without the disadvantages associated with the prior art methods.

It is a further object of the invention to provide a method to remove gaseous contaminants present in gaseous or air streams using activated carbon cloth material as sorbent that can be regenerated "in-situ" effectively, uniformly and very rapidly by passing an electric current through the carbon cloth material under vacuum.

A further object of the invention is to provide a method and apparatus for the effective recovery of evacuated contaminants for disposal or processing.

This invention also provides for the continuous removal of contaminants from a gaseous stream, especially an air stream, on a sorbent, and subsequent rapid non-destructive regeneration of the sorbent. The invention provides for a sorbent bed having minimal pressure drop and a lengthy life expectancy, the original adsorptive capacity of which is essentially restored by regeneration, and where bed depth is limited only by the capacity of the host system.

In accordance with one aspect of the invention, there is provided a method for removing a contaminant from a gaseous stream bearing the contaminant comprising:
  i) flowing the gaseous stream bearing the contaminant into a chamber housing a resilient compressible electrically conductive, activated carbon cloth material,
  ii) adsorbing said contaminant on said cloth material with formation of a carbon cloth material loaded with said contaminant, and a gaseous stream liberated of said contaminant, and removing said gaseous stream from said chamber; and
  discontinuing the flow of gaseous stream bearing the contaminant into the chamber, placing said chamber under vacuum and passing an electric current through said carbon cloth material loaded with said contaminant to generate heat in said carbon cloth material effective to desorb said contaminant from said carbon cloth material, while maintaining said vacuum.

In accordance with another aspect of the invention, there is provided a method of desorbing a contaminant from a resiliently compressible, electrically conductive, activated carbon cloth material loaded with adsorbed contaminant comprising:
  a) housing said carbon cloth material loaded with adsorbed contaminant in a chamber,
  b) placing said chamber under vacuum, and passing an electric current through said carbon cloth material and generating heat in said carbon cloth material effective to desorb said contaminant from said carbon cloth material.

In accordance with still another aspect of the invention, there is provided a device for removing a contaminant from a gaseous stream bearing the contaminant comprising:
  a) a chamber housing a resiliently compressible, electrically conductive, activated carbon cloth material;
  b) said chamber housing a first port for introduction into said chamber of a gaseous stream bearing contaminant and a second port for removal from said chamber of the gaseous stream liberated of the contaminant;
  c) a pair of spaced apart electrodes in said housing, said electrodes being electrically in contact with said carbon cloth material for flow of electric current between said electrodes and through said carbon cloth material, said carbon cloth material generating heat on passage of said electric current therethrough, and
  said chamber being gas-tight to support a vacuum therein during the generation of heat by the carbon cloth material.

In accordance with yet another aspect of the invention, there is provided a device for desorbing a contaminant from a resiliently compressible, electrically conductive, activated carbon cloth material loaded with adsorbed contaminant comprising:
  I) a chamber housing said carbon cloth material,
  II) a pair of spaced apart electrodes in said housing, said electrodes being electrically in contact with said carbon cloth material for flow of electric current between said electrodes and through said carbon cloth material, said carbon cloth material generating heat on passage of said electric current therethrough,
  III) said chamber being gas-tight to support a vacuum therein during the generation of heat by the carbon cloth material, and
  IV) an exhaust port for exhausting under vacuum a contaminant desorbed from the carbon cloth material by the heat generated by the carbon cloth material.

DESCRIPTION OF PREFERRED EMBODIMENTS a) Adsorption and Desorption

The invention contemplates adsorption of contaminant from a gaseous stream bearing the contaminant on an activated carbon cloth material which is electrically conductive and resiliently compressible.

The invention also contemplates desorption of the contaminant from the cloth material loaded with adsorbed contaminant.

The adsorption is typically carried out at ambient temperatures of 10 to 30° C., more especially about 20° C. by flowing a gaseous stream bearing the contaminant through the activated cloth material; the contact time for adsorption is typically less than 1 second and more especially less than 0.1 second.

The contaminant may be a useful material which may be recovered for re-use in a subsequent step, for example, solvent which accumulates in the atmosphere in industrial premises; or it may be a noxious or non-useful material which is to be collected for disposal. In general, the contaminants will be organic substances which vaporize at moderate temperatures, for example industrial solvents, or organic or inorganic gases or fine particulate organic or organometallic substances which vaporize at elevated temperatures or thermally degrade at elevated temperatures to discharbeables gases.

The desorption is carried out by heat generated in the carbon cloth under vacuum, which heat vaporizes the contaminants. The heat is generated by passing electric current through the carbon cloth and the level of heat generated can be varied by compression or decompression of the carbon cloth or by passing a larger or smaller electric current through the carbon cloth; or both. Thus, the heat or temperature can be selected depending on the contaminant or contaminants to be desorbed and the desired rate of desorption. Higher temperatures result in more rapid desorption, however, contaminant thermal decomposition or degradation is more likely at higher temperatures.

It is within the scope of the invention to generate the heat at levels which are effective to thermally degrade organic contaminants to simple molecules such as carbon dioxide, nitrogen and water which can be discharged to the atmosphere, or simple molecules such as ammonia and sulphur dioxide which can be discharged to atmosphere or recovered.

In general desorption is readily achieved at a temperature, developed by the carbon cloth under a vacuum of, not more than 10 torr and more preferably less than 5.0 torr, more preferably less than 1 torr and most preferably less than 0.5 torr, of 250° C. to 500° C., more especially 300 to 350° C., and at such temperatures desorption is completed in 20 to 45 minutes and typically less than 30 minutes.

In the case where the contaminant is to be thermally degraded, temperatures of the order of 1000° C. or more are readily developed in the carbon cloth by adjustment of the level of compression, or varying the current flowing through the carbon cloth.

The desorption of contaminant under vacuum from the carbon cloth material regenerates the activated carbon cloth, essentially to its original adsorptive capacity. The operation in a vacuum avoids degradation of carbon cloth by air and permits use of lower heating temperatures for desorption which similarly avoids degradation of the carbon cloth exhibited at high temperatures.

b) Carbon Cloth Material

The adsorbent or sorbent employed in the invention is a carbon cloth material. The carbon cloth material is electrically conductive and not only achieves a wide range of heat generation on compression, but large heat increase is achieved rapidly on application of relatively minor change of compressive force.

In particular, the cloth material which may, for example, be woven, non-woven, knitted or felted may be carbon cloth, carbon felt, carbon impregnated cloth or graphitized carbon cloth.

The carbon cloths and felts are formed by carbonizing cloths and felts of organic fibers, filaments, monofilament yarns and multi-filament yarns which may be synthetic, for example, polyacrylonitrile fibers, filaments or yarns, or natural, for example, cotton or carbon pitch.

Carbon cloths deteriorate in the presence of oxygen at temperatures above 400° C. In applications where these cloths are employed for development of temperatures above these levels, chemical treatment of the cloths to inhibit oxidation, may be necessary, inert (non-oxygen) gas bearing contaminants do not face this shortcoming.

Heat is generated in the carbon cloth material by the passage of electric current between the electrodes and through the carbon cloth material, and this heat serves to desorb contaminant from carbon cloth which has been previously loaded with the contaminant by adsorption from a gaseous stream bearing the contaminant.

The expression "resiliently compressible" is to be understood as indicating that the carbon cloth material can be compressed by application of a compressing force thereto and that the material expands or is restored to substantially its pre-compression state on removal of the compressing force. In part the cloth material may be considered to have an elastic memory of the pre-compression state so that it can be compressed repeatedly to different levels of compression but restored to the initial state or to a less compressed state on release or partial release of the compressive force.

It will be understood that the resilience or ability of the compressed heating element to relax to its pre-compression state may be altered by age.

References to varying the compression of the heating element contemplate decreasing the compression, i.e., decompressing so as to increase the heat generated and increasing the compression, i.e., compressing to decrease the heat generated.

The carbon cloth material may be in a partially compressed state initially to effect a desired initial level of heating for a particular electric current. The carbon cloth material may then be subjected to decreasing levels of compression to increase the level of heat generated.

The cloth material should suitably withstand the heat which it generates at temperatures to be developed, and not degenerate on continuous, continual or repeated exposure to such heat. The carbon cloth material may, in particular, comprise a plurality of layers of electrically conductive carbon cloth in adjacent side-by-side relationship, each layer of the plurality is in electrical contact at least with an adjacent layer and in particular a major face of each cloth layer is in electrical contact with a major face of an adjacent cloth layer, the cloth layers forming a stack bed or pile in which the layers are in opposed facing relation. The stack or pile need not, however, be disposed such that the layers are horizontal and any disposition of the layers from horizontally oriented to vertically oriented is possible.

The plurality of layers may be formed from discrete separate layers which may be the same or different, or may be formed from a continuous length of cloth folded repeatedly in concertina fashion to produce the plurality of layers or may be formed from combinations of separate lengths folded in concertina fashion and stacked together or combinations of separate lengths folded in concertina fashion and discrete separate layers, stacked together.

c) Compressive Force

In especially preferred embodiments the resiliently compressible, electrically conductive cloth material comprises a plurality of layers of carbon cloth disposed in a separating space between a pair of spaced apart electrodes such that the outermost layers of the plurality of layers are in electrical contact with the electrodes, thereby providing a path for flow of electric current between the electrodes.

In this case, one or both of the electrodes is adjustably positionable to alter the distance separating the electrodes, i.e., the length of the separating space. Adjusting the position of one or both of the electrodes to vary the distance separating them provides a compressive or decompressive force on the plurality of cloth layers.

It is also possible, however, to dispose the layers between a pair of spaced apart insulated members, for example, ceramic members, with electrical connectors extending from the electrodes through the insulated members to make electrical contact with the cloth layers or directly to the outer cloth layers. In this case adjusting the position of one or both of the insulated members to vary the separating space between the insulated members provides the required compressive or decompressive force.

It will be understood that the electrodes or insulated members must have a structural integrity capable of applying the compressive force to the cloth layers.

DESCRIPTION OF PREFERRED EMBODIMENT WITH REFERENCE TO THE DRAWINGS

Figure 1:
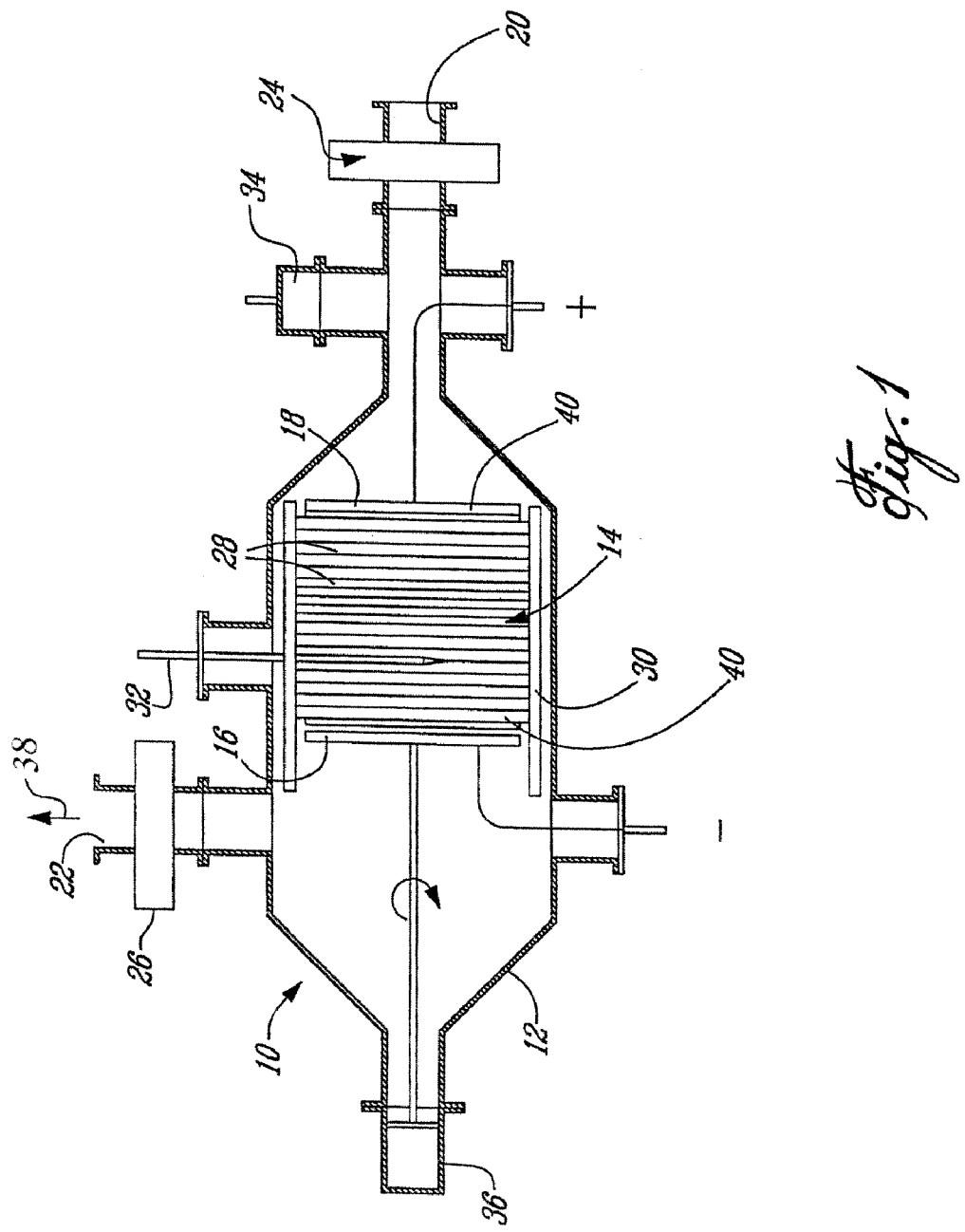
FIG. 1 is a schematic view of a device of the invention for use in carrying out the methods of the invention.

With further reference to FIG. 1, a device 10 of the invention has a chamber 12 housing a sorbent bed 14. Opposed ends of the bed 14 are in electrical contact with copper electrodes 16 and 18 respectively.

Chamber 12 has an inlet port 20, an outlet port 22 and vacuum valves 24 and 26.

Sorbent bed 14 is composed of a plurality of activated carbon cloth layers 28 in side-by-side relationship, with adjacent layers 28 in electrical contact, the resulting sorbent bed 14 being resiliently compressible, and disposed between graphite cloth layers 40. Sorbent bed 14 is housed within a ceramic sleeve 30.

A thermocouple 32 measures the temperature in the sorbent bed 14.

Chamber 12 further includes a pressure transducer 34 and a vernier 36 to adjust the spacing between copper electrodes 16 and 18, thereby varying the degree of compression of the carbon cloth layers 28 of sorbent bed 14.

Outlet port 22 is connected to a source of vacuum 38 (not shown).

Figure 2:
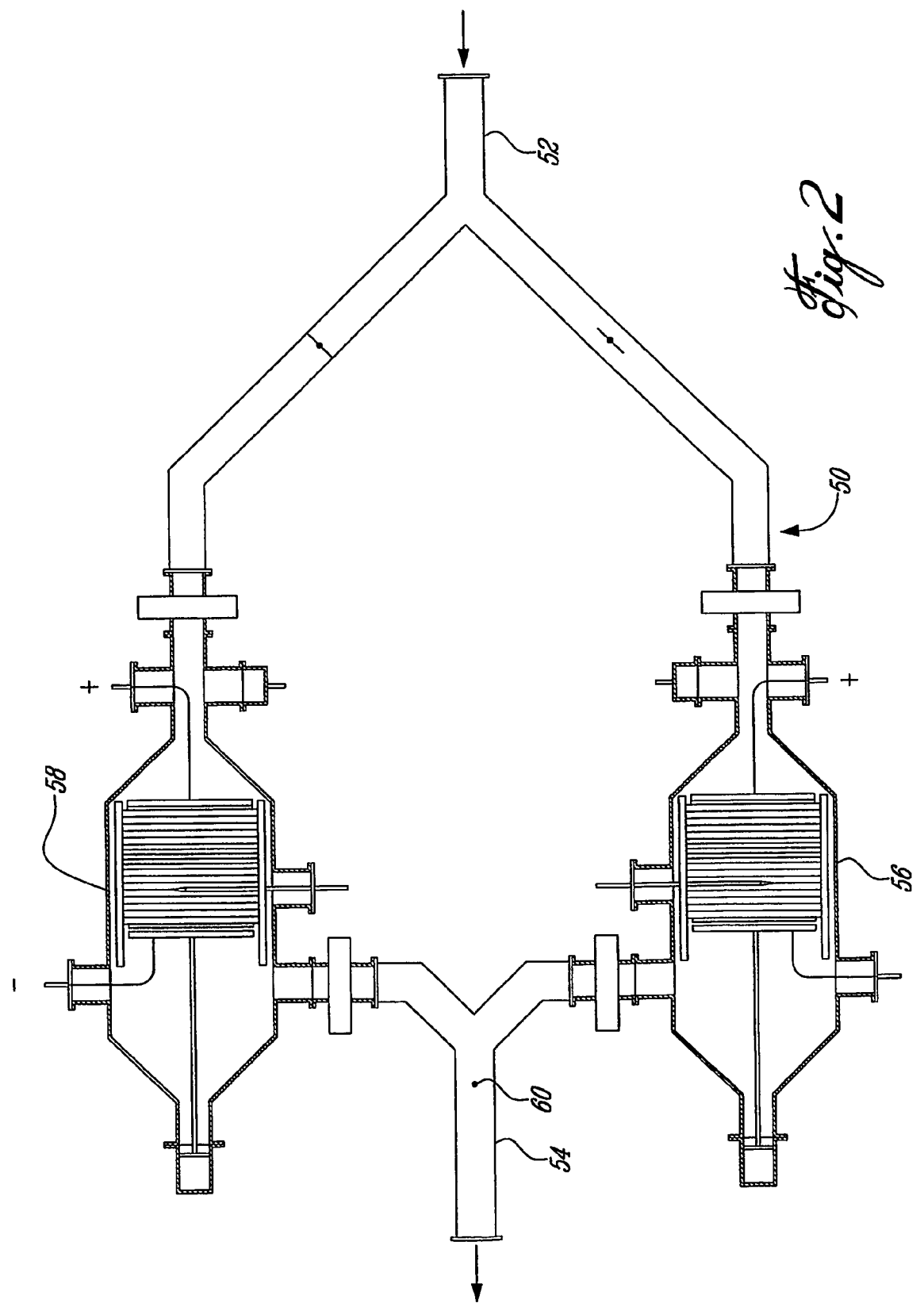
FIG. 2 illustrates schematically a detection system for use in the method of adsorbing contaminants of the invention.

With further reference to FIG. 2, there is illustrated a system 50 employing a pair of devices 56 and 58 of the invention in parallel. Device 56 being in use for adsorption of contaminants and device 58 being under regeneration of the activated carbon cloth.

System 50 further includes a contaminated gaseous stream line 52 and a clean gaseous stream line 54. A sensor 60 is disposed in line 54.

The devices 56 and 58 are particularly of the same form as device 10 illustrated in FIG. 1.

Figure 3:
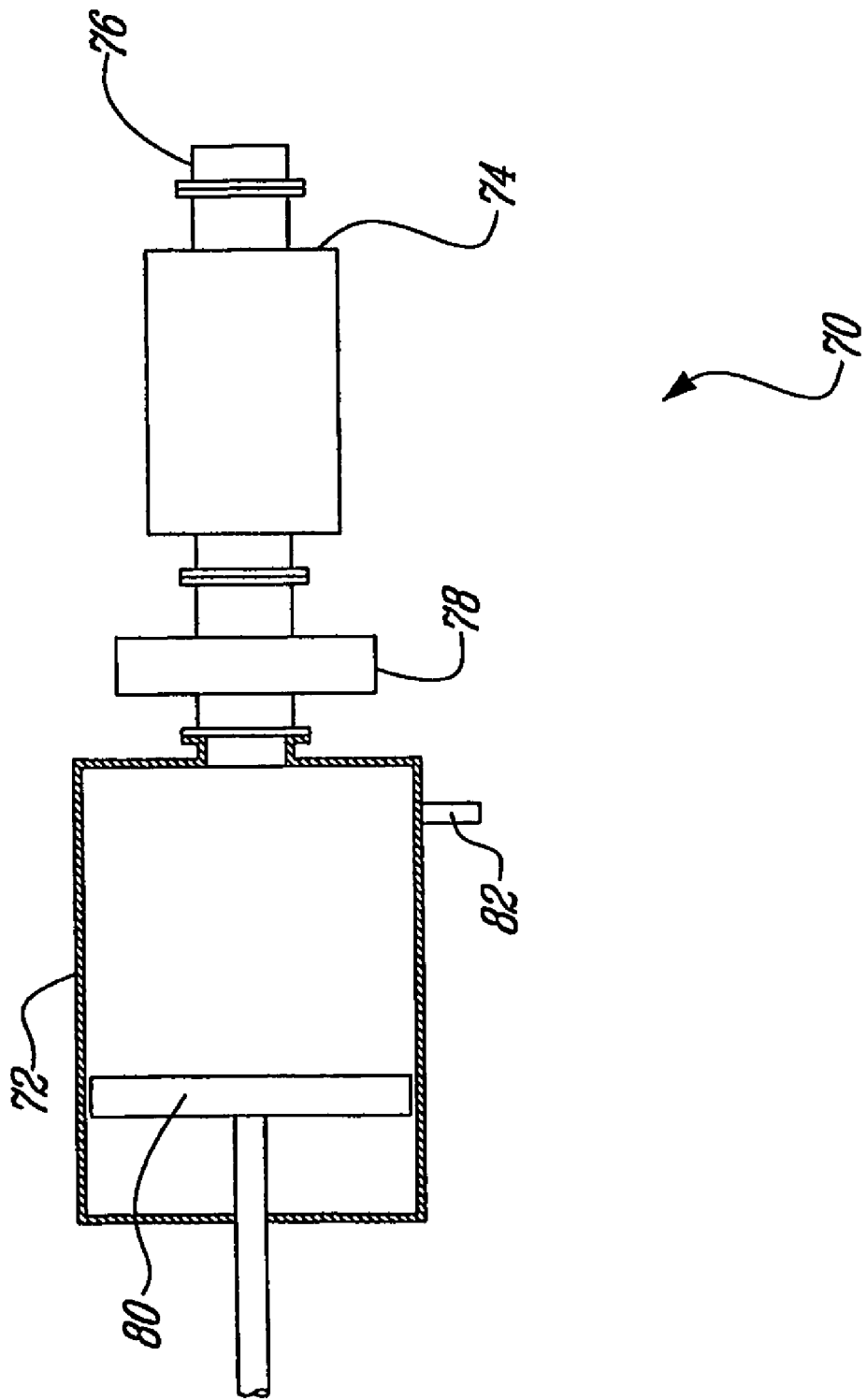
FIG. 3 illustrates schematically apparatus for collection of desorbed contaminant in accordance with the invention.

With further reference to FIG. 3, a contaminant recovery assembly 70 for use in conjunction with the device 10 of FIG. 1 during the regeneration of the carbon cloth includes a recovery container 72 and a vacuum pump 74.

Contaminant inlet line 76 in operation would communicate with outlet port 22 of device 10 in FIG. 1.

Assembly 70 further includes vacuum valve 78 and container 72 further includes a pneumatically activated piston 80 and a liquid contaminant outlet 82.

In operation of the device 10 of FIG. 1, a gaseous stream bearing contaminant flows through inlet port 20 into chamber 12 and passes through the sorbent bed 14, the contaminant being adsorbed from the gaseous by the activated carbon cloth layers 28; gas liberated of contaminant flows out of chamber 12 through outlet port 22. This adsorption process may be carried out at ambient temperature.

Thus, by reference to FIG. 2, the gas liberated of contaminant which leaves chamber 12 through outlet port 22, flows into clean gaseous stream line 54, the contaminant being retained in sorbent bed 14 which effectively is in the device 56 of FIG. 2. By further reference to FIG. 2, the contaminated gaseous stream thus flows through device 56 but not through device 58. The level of contaminant in the gaseous stream in clean gaseous stream line 54 is monitored by sensor 60.

When sensor 60 detects an unacceptable level of contaminant indicating that the effectiveness of the sorbent bed 14 in the device in use 56, has been reduced as a result of loading of the bed 14 with contaminant, the flow of contaminated gaseous stream into device 56 is discontinued.

During the period of use of device 56, device 58 has been under regeneration of the sorbent bed 14. Device 58 is now brought into use and the contaminated gaseous stream is fed through device 58 for removal of contaminant and the gase stream liberated of contaminant flows to clean gaseous stream line 54 where the level of contaminant is monitored by sensor 60. During this operation, device 56 which is no longer in use, is subjected to the regeneration of the sorbent bed.

The regeneration is further described with reference to FIG. 1.

In carrying out the regeneration, inlet port 20 is closed and outlet port 22 is connected to a source of vacuum 38, and the chamber 12 is evacuated. Electric current is fed between copper electrodes 16 and 18 and passes through the carbon cloth layers 28 of sorbent bed 14, which layers 28 are loaded with contaminant previously adsorbed from the gaseous stream. The passage of electric current generates heat in the carbon cloth layers 28, and the level of heat can be varied by varying the compression on the carbon cloth layers 28. The compression is varied by varying the distance separating electrodes 16 and 18, this distance being altered by moving electrode 16 relative to electrode 18 by means of the vernier 36.

This latter operation of varying the level of heat generated is fully described in U.S. Pat. No. 6,107,612, the teachings of which are incorporated herein by reference.

The level of heat generation is adjusted as described to achieve a level appropriate for desorption of the contaminant, under the vacuum in chamber 12 from the cloth layers 28. In general, a temperature in the range of 300° to 500° C. is sufficient for most contaminants, under a vacuum of 10 Torr or less, and desorption of the carbon cloth layers 28 is completed in 20 to 45 minutes.

The contaminants are desorbed in a gaseous or vapor state depending on the temperature generated. If desired, heat generation can be effected to a high temperature for thermal degradation of the contaminant to simple gaseous molecules which can be discharged to atmosphere, in those cases where it is not desired to collect the contaminant for reuse or for disposal.

The desorbed contaminant or the thermal degradation product is exhausted from chamber 12, under vacuum, through outlet port 22.

With further reference to FIG. 3, there is illustrated a contaminant recovery assembly 70 for use in conjunction with device 10 of FIG. 1 for the case in which the contaminant is being recovered rather than thermally degraded, either for reuse or disposal.

The contaminant exiting chamber 12 through outlet port 22 of FIG. 1 is drawn by vacuum pump 74 along contaminant inlet line 76 and into recovery container 72. Container 72 can be sealed from inlet line 76 when desired. Contaminant vapors collected in recovery container 72 can be compressed to liquid form by pneumatically activated piston 80 and ultimately the resulting contaminant liquid can be discharged from outlet 82 either for disposal or for reuse in industrial processes.

GENERAL TECHNICAL DESCRIPTION

As described above, FIG. 1 is a schematic cross-section of an apparatus for the adsorption and desorption of gaseous contaminants in a gaseous stream of the invention.

It is constructed entirely with commercially available components used for low vacuum work, that is, with flanged piping having seals allowing low pressures (<0.1 mmHg) to be reached without leakage. The sorbent bed 14 is contained in ceramic sleeve 30 between electrodes 16 and 18 which suitably are copper ring electrodes, however, conductive metal used is determined by the characteristics of the contaminant gaseous stream. For instance, a corrosive gaseous stream would require a metal such as stainless steel.

The sorbent bed 14 is contained between non-adsorptive graphite cloth layers 40 that ensure even distribution of electrical current to the bed 14. Thermocouple 32 in the sorbent bed 14 monitors the temperature during regeneration and pressure transducer 34 monitors the pressure in the chamber 12 during this process. Vernier 36 or a similar less sophisticated device such as a screw allows the operator to select the distance between the electrodes 16 and 18 to attain the desired regeneration temperature (U.S. Pat. No. 6,107,612, Farant). The temperature of the sorbent bed 14 can also be varied by increasing the current applied to the bed 14 and keeping the electrodes 16 and 18 fixed. It should be noted however, that the electrode distance will still have to be reset periodically due to the reduction in the depth of the sorbent bed 14, as a result of shrinkage, following extended usage.

Adsorption process

The properties of the sorbent bed 14 used are dictated by the nature of the gaseous contaminants to be removed from the gaseous stream, that is, the pore size distribution of the sorbent bed 4 is pre-selected for particular conditions. The adsorptive capacity of the sorbent bed 14 and its bed depth are also selected according to the anticipated range of contaminant concentrations and the gaseous flow rate and desired time between regeneration phases.

The contaminated gaseous stream, at room temperature, is introduced into the device 10 of FIG. 1 The time of contact with the sorbent bed 14 is <0.1 second. The adsorption process is suitably terminated when 0.1% of the concentration of components of the contaminated gaseous stream are detected in the clean air stream (FIG. 2) by sensor 60. At this moment, the contaminated air stream is rerouted via the second identical device 58 located in a parallel duct (FIG. 2). This is accomplished by closing the access valve to the duct containing the device in use (56) and simultaneously opening the valve in the duct leading to the regenerated device (58). In this manner, the flow of contaminated gaseous is not interrupted during the regeneration process. Depending on the nature and concentration of the components in the contaminated gaseous stream, the second gaseous purification system may not be necessary, and the contaminated gaseous could be vented to the atmosphere during the 20 to 45 minutes required to regenerate the sorbent bed 14. Regeneration frequency could be as much as once per hour thus allowing the gaseous purification system to react to varying concentrations of contaminants in the gaseous stream.

Desorption process

Prior to initiating desorption, the gaseous purification system is sealed off with valves which allow the chamber 12 to reach <0.1 mmHg without excessive leakage. The chamber 12 is then rapidly evacuated until an appropriate vacuum is reached (requires 5 minutes or less). The electrodes 16 and 18 are then positioned and current applied to the sorbent bed 14 until it reaches the desired temperature (300 to 500 C; requires 1 minute or less). The wattage required to achieve this temperature is relatively low(<20 watts). This high temperature/low pressure treatment is continued for 20 to 45 minutes (depending on the bed depth, contaminant content and temperature). The contaminants evacuated from the chamber are routed to a recovery container 72. It is noteworthy that the temperature of the outer wall of the chamber 12 never exceeds 40 C and does not require that any special safety measures be implemented. Once the heating/vacuum period is completed, the current to the sorbent bed 14 is turned off and the latter is allowed to cool to <100 C (15 minutes or less) before turning the vacuum pump 74 off and allowing air to gain access to the chamber 12.

With one specific contaminant, toluene, the process of adsorption/regeneration was repeated some 50 times over a six-month period with no effect on the adsorptive capacity and physical integrity of the sorbet bed 14.

Contaminant recovery

The gaseous contaminants electrothermally desorbed from the sorbent bed during the regeneration cycle are pumped by a vacuum (50-70 Torr)/pressure (20-60 psig) pump directly into a recovery container 72 maintained at low pressure (<400 Torr) (FIG. 3). Once the regeneration phase is completed, the access valve 78 to the recovery container 72 closes automatically. The piston 80 is repositioned to maintain the low pressure in the container 72 (<400 Torr). After a number of regeneration cycles (determined by the size of the container 72) and at a point when the piston 80 has reached its lowest point, the piston 80 is activated to compress the volume of the recovery container 72 to an internal pressure required to cause most of the gaseous contaminant to condense to the liquid phase. The outlet 82 is then opened to release the liquefied contaminant into a waste disposal container. The piston 80 is then returned to a position that resets the internal pressure of container 72 to <400 Torr, ready for the next regeneration cycle. Alternatively, the vacuum pump 74 could be eliminated and the process of creating an adequate vacuum within the assembly 70 could be achieved by the motion of the piston 80 within the container 12.

APPLICATIONS OF TILE INVENTION.

While reference has generally been made to gaseous streams bearing contaminant, in most cases the gaseous will be air, and will be further described by reference to contaminated air. Nevertheless, the invention can be employed for removal of contaminants from gases other than air, provided that such gases are inert to the processes of adsorption and desorption of the invention.

The invention described herein can be applied equally well to a system characterized by a continuous air stream flow or one which features a periodic, continual or interrupted air flow.

1) Continuous Air Flow System

An excellent example of this type of system is the HVAC system found in office towers. The air flow is continuous and its contaminant content is complex in nature and low in concentration. Odor control is a major requirement for such a system. HVAC systems have been identified as a main cause of indoor air quality complaints in office buildings.

The invention described above provides for one of two possibilities. That is, the air purification system (i.e. the adsorption/desorption device) could be integrated as part of the main ventilation system or smaller units could be easily retrofitted in the main air exhaust ducts conveying return air to the main system from each floor. Both types of air purification systems allow for a greater amount of air re-circulation since the contaminated return air is effectively cleansed of its gaseous, odoriferous pollutants. It is anticipated that a properly designed air purification system, based on the invention described herein, would effectively control odors and gaseous contaminants during a given workday. The regeneration of the sorbent could be scheduled after hours. The air purification system would then be ready for use for the next workday. The cost of retrofitting an air purification system and operating it would be recovered through significant reduction in the cost of heating/cooling the air supplied to the building. Such a system would also effectively address complaints of poor indoor air quality by the occupants of the building. It should be noted that such an air purification system would be amenable for use in other enclosed spaces served by a continuous air flow such as aircraft cabins, trains, metro cars, vehicles and private residences.

2) Periodic Air Flow

A good example of this type of air flow is personal respirators worn by workers using solvents and/or exposed to other gaseous contaminants during their workday. One major insurmountable problem with such gaseous contaminant respirators, to date, is their inherent lack of warning of their sudden loss of efficiency leading to the worker wearing them being placed at risk of injury and even death. Recent legislation in the USA and Canada requires this problem to be corrected. The invention described herein would eliminate the problem by incorporating the air purification system in a removable cartridge of the respirator. The modifications required to accomplish this are readily achievable and would allow for the "in-situ" regeneration of the sorbent of the cartridge after each instance of usage. To achieve this, each cartridge is connected to a source of vacuum and electricity and the temperature applied to its sorbent attained by adjusting the electrodes and/or increasing/decreasing the electric current applied to them in accordance with the invention. The temperature of the sorbent during the regeneration cycle (typically 30 minutes) is monitored with a thermocouple positioned in the sorbent bed. Each respirator cartridge is then returned to its initial adsorptive capacity after each usage assuring the safety of the workers who wear them. The status of the sorbent bed can be monitored by observing changes in its resistivity.

3) Other Applications

It is one of the great advantages of this invention that it can be integrated in virtually all types of systems where the removal of gaseous contaminants from an air stream is required. In this sense, it does not suffer from limitations in its applications inherent in previous art. For instance, the invention described herein could be used beneficially to eliminate gaseous contaminant emissions from industrial stacks and for the recovery of valuable solvents released by chemical processes.

NOTABLE FEATURES OF THE INVENTION

One of the outstanding features of the invention described herein is the rapid heating of a carbon cloth loaded with adsorbent contaminants to elevated temperatures under high vacuum with the resultant rapid and effective desorption of the contaminants and regeneration of the activated carbon cloth "in-situ" in a relatively short period of time (typically <30 minutes).

Another remarkable feature possessed by this invention is the ability it affords to effectively recover most, if not all, of the contaminants desorbed during the regeneration process, an ability which is due, in large part, to the relatively small volumes of evacuated air handled (essentially the volume of the chamber).

Furthermore, the sorbent exhibits a long life and conserves essentially all of its original adsorptive capacity over a lengthy period of usage, involving repeated adsorption and desorption steps.

The period of time between regeneration of the sorbent bed for this type of air purification system is dictated by the depth of the sorbent bed, the adsorptive capacity of the carbon cloth of the bed, the concentration of gaseous contaminants in the air stream, and rate of air flow. Since the sorbent bed depth allowed by the invention is only limited by the capacity of the air moving equipment of the host system, the period of time between regeneration can be as lengthy as one desires. It should be noted that, this is one of the major limitations of carbon cloth sorbent beds appearing in prior art to date. Essentially, they are limited to a relatively small sorbent bed depth because of the configuration adopted.

The power utilized (watts) to heat the carbon cloth to effect its regeneration is also much lower than that proposed by prior art for two reasons: (1) the duration of the regeneration cycle (typically 30 minutes or less) and (2) the manner in which the electric current is applied to the carbon cloth sorbent bed, that is, in the preferred "a" direction (from the top to the bottom of the carbon cloth or from face-to-face through the thickness of the cloth) rather than the more resistive "b" direction (from one end to the other of the carbon cloth i.e. edge-to-edge.).

Another feature of this invention is that it allows for an affordable, cost-effective, rapid retrofitting in a large variety of air purification systems compared to prior art.

The preferred configuration of the carbon cloth sorbent bed also allows a designer greater latitude in pre-selecting the pressure drop desired across it. This configuration allows for the pressure drop to be minimized by appropriate selection of the weave of the cloth and porosity and the beneficial use of conductive metal spacers within the sorbent bed itself.

The life expectancy of a given carbon cloth sorbent bed described herein (that is, until its replacement is required) is estimated at greater than six months based on normal usage.

Since the regeneration process is conducted in a high vacuum (typically less than 10 torr and preferably less than 0.51 torr), temperatures approaching 1000° C. could be used with attendant shortening of the regeneration period and increased effectiveness of the regeneration process.

LIMITATIONS OF THE INVENTION

A possible limitation of the invention described herein is one that plagues all carbon-based sorbent beds, that is, the reaction between the carbon and corrosive gaseouses such as HF if present in the air stream being purified. This leads to the formation of fluorocarbons at high temperatures. However, since the regeneration process is conducted in a high vacuum for a relatively short period of time, it is likely that this will not be a problem.

A possible design limitation is the requirement for a sorbent bed chamber having non-conductive walls. This potentially could limit the overall dimensions of the air purification system that could be designed based on the invention described. However, preliminary trials based on the application of a ceramic paste to the inner surface of a stainless steel chamber and its subsequent baking at elevated temperatures promises to remove this limitation.

Laboratory Results

Figure 4:
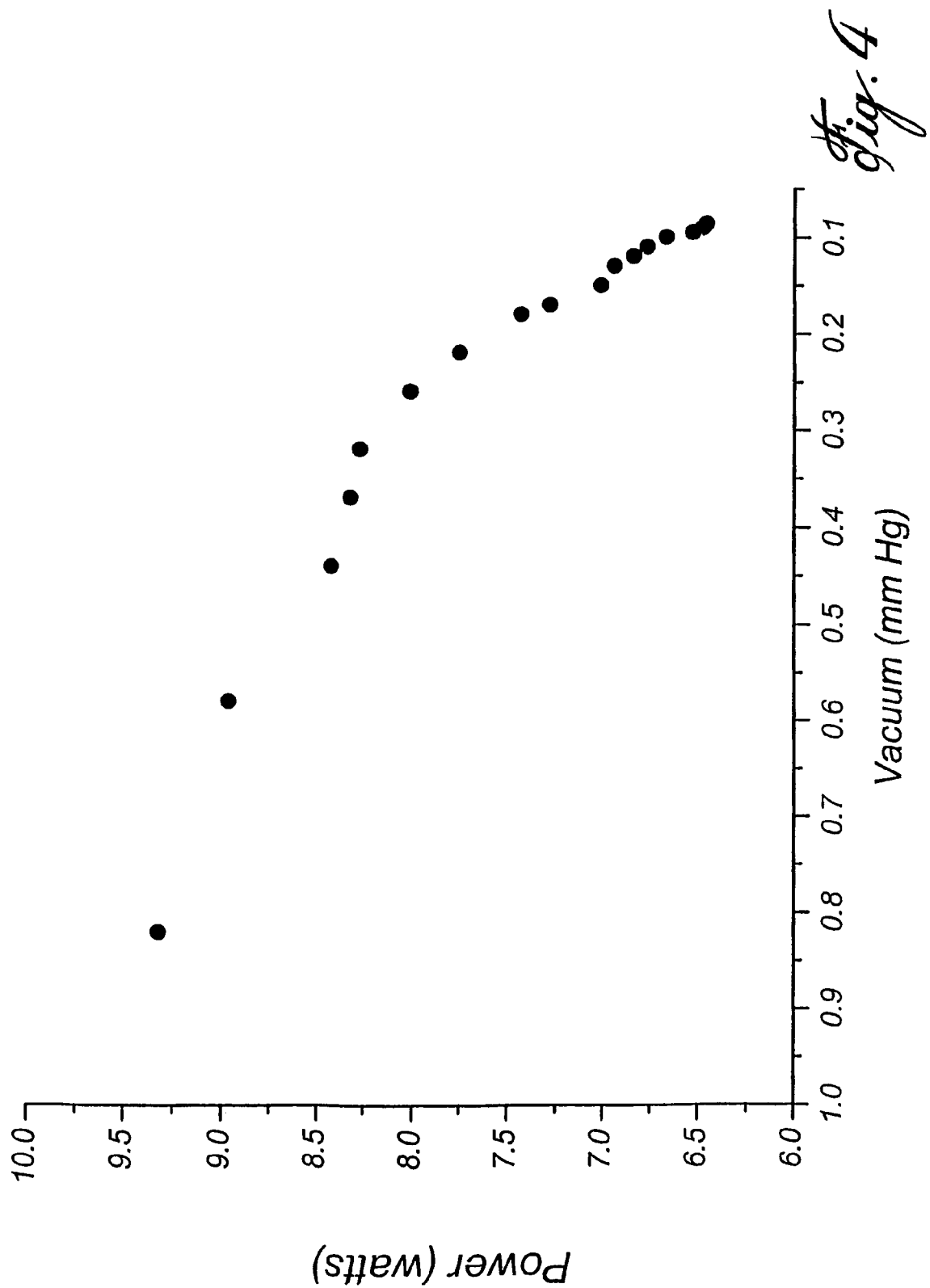
FIG. 4 illustrates graphically the relationship between power consumption and vacuum in the chamber of the device of the invention.

FIG. 4 demonstrates how the power consumption (watts) and the vacuum (mm Hg) measured in the carbon sorbent bed chamber decrease concomitantly with time during the regeneration procedure conducted at 301° C. for 30 minutes. Readings were taken at 1 minute intervals and temperature was maintained at 301±2° C. The power consumption is reduced by one third of its initial value. It is matched by an almost ten-fold reduction of the ambient pressure in the chamber. Both of these reductions are most likely related to the removal of the adsorbate (toluene) from the carbon cloth. The attainment of both relatively low power consumption and chamber pressure could be used as indicators of the status of the regeneration process. This result clearly demonstrates the relatively low power consumption required to achieve complete regeneration of the carbon cloth sorbent.

Figure 5:
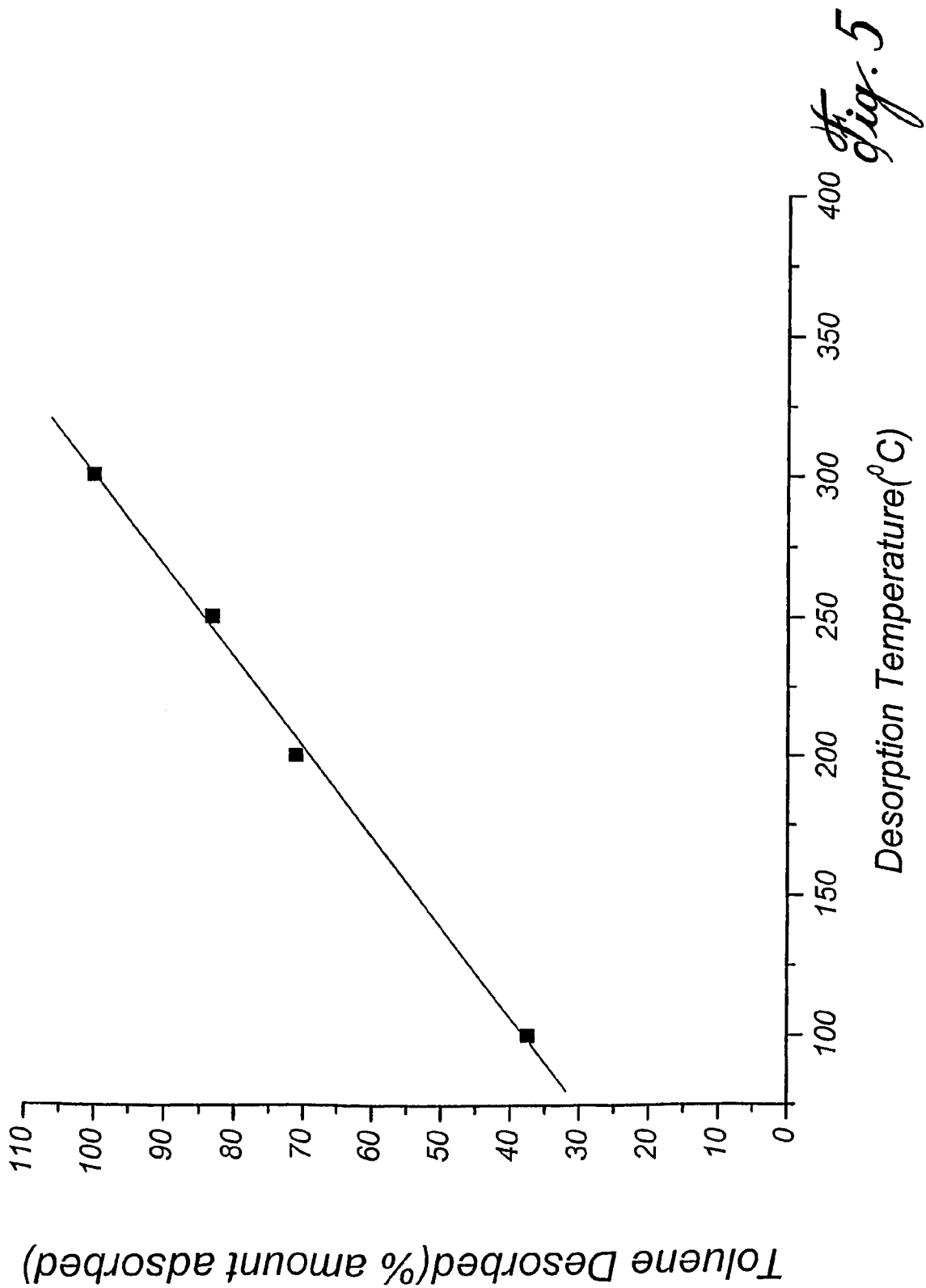
FIG. 5 illustrates graphically the relationship between the equilibrium temperature of carbon cloth material in a device of the invention and the amount of adsorbate (toluene) removed in a 30 minute period.

FIG. 5 exemplifies the relationship between the equilibrium of the carbon cloth sorbent bed temperature and the amount of adsorbate (toluene) removed in a 30-minute period. A linear relationship is obtained ($r^2$=0.9985) to 300° C. It demonstrates that the amount of contaminant removed is directly dependent upon the temperature electrothermally applied to the sorbent bed. In these tests, 100% regeneration was achieved at 300° C. under an average ambient pressure (chamber) of 0.26 mmHg (0.26 torr). This result is obtained at all temperatures greater than 300° C. in this period of time. The results show the relationship:

% toluene desorbed=7.2+0.31×desorption temperature

These results clearly demonstrate the rapidity of the regeneration process conducted as described by this invention.

Figure 6:
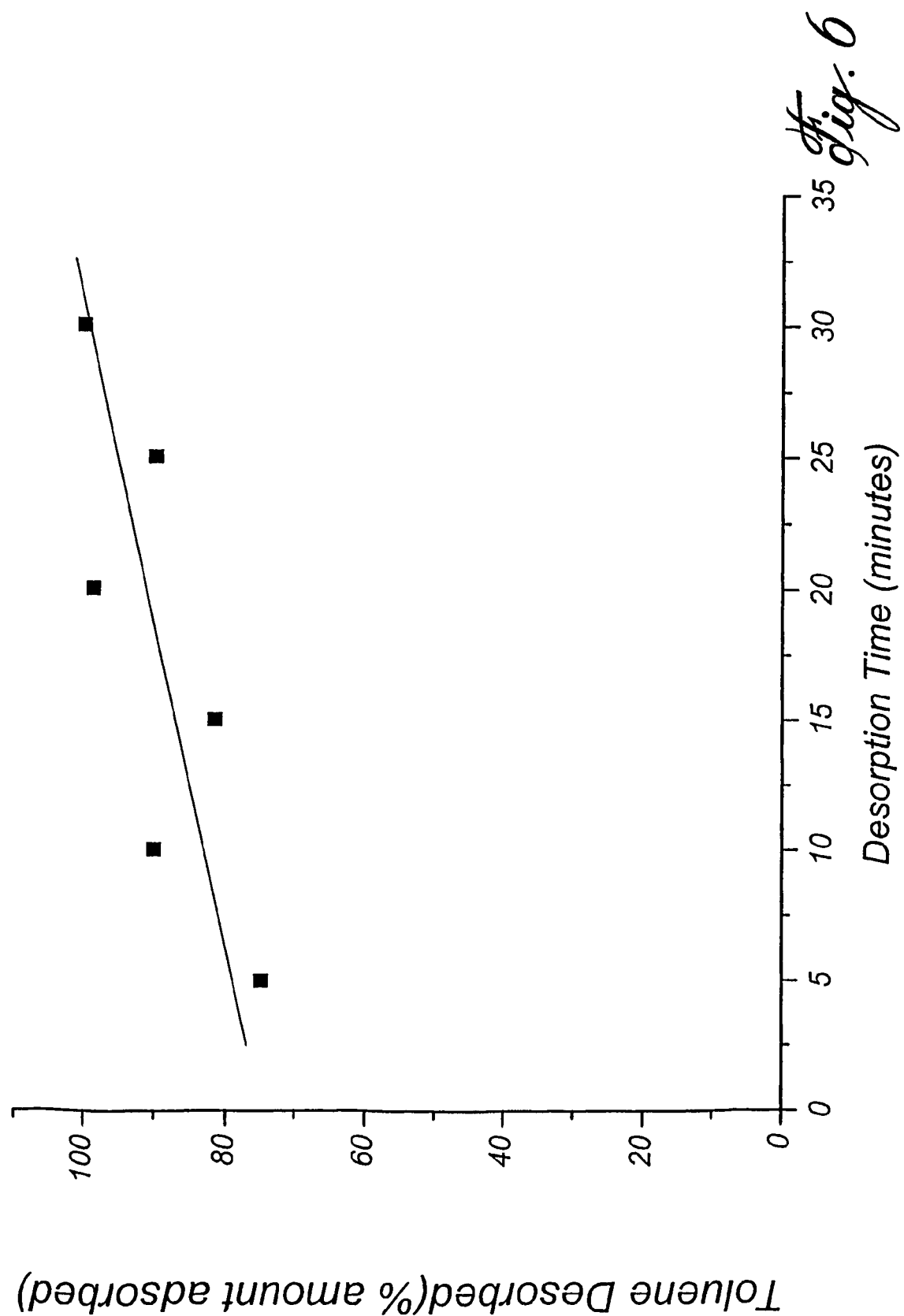
FIG. 6 illustrates graphically the relationship between the amount of desorption (toluene) and the desorption time in a device of the invention.

FIG. 6 shows the relationship between the amount of adsorbate (toluene) removed from the carbon cloth sorbent and the duration of the regeneration process (desorption) at an equilibrium temperature of 300° C. under an average sorbent chamber vacuum of 0.5 mmHg (0.5 torr). It is notable, that under these conditions, greater than 70% regeneration was achieved in five minutes, and that greater than 80% of adsorbate is removed in 20 minutes or less. This result clearly demonstrates that an acceptable amount of regeneration (80% or more) could be achieved using the process described herein in relatively short time. Variations in the duration of the regeneration process also would not have a significant impact on the percent of regeneration achieved.

The relationship may be formulated as:

% toluene desorbed=74.9+0.81×desorption time A linear relationship is obtained ($r^2$=0.78).

The invention claimed is:

1. A method for removing a contaminant from a gaseous stream bearing the contaminant comprising:
   i) flowing the gaseous stream bearing the contaminant into a chamber housing a resilient compressible electrically conductive, activated carbon cloth material,
   ii) adsorbing said contaminant on said cloth material with formation of a carbon cloth material loaded with said contaminant, and a gaseous stream liberated of said contaminant, and removing said gaseous stream from said chamber;
   iii) discontinuing the flow of gaseous stream bearing the contaminant into the chamber, placing said chamber under vacuum and passing an electric current through said carbon cloth material loaded with said contaminant to generate heat in said carbon cloth material effective to desorb said contaminant from said carbon cloth material, while maintaining said vacuum; and
   wherein said activated carbon cloth material in step i) comprises a plurality of layers of electrically conductive activated carbon cloth, wherein each layer of said plurality of layers is in electrical contact with at least an adjacent layer of said plurality of layers, and said plurality of layers is disposed between, and in electrical contact with. first and second spaced apart electrodes, and step iii) comprises altering the level of compression of said material to vary the generation of heat to a desired level for desorption of said contaminant from said carbon cloth material.

2. A method according to claim 1 including:
   iv) exhausting the contaminant desorbed from said cloth material in step iii) from said chamber under said vacuum.

3. A method according to claim 1 wherein said vacuum is less than 1.0 torr.

4. A method according to claim 1 wherein said heat generated in step iii) is effective to establish a temperature of 300 to 500° C. in said carbon cloth material, and the desorption is completed in 20 to 45 minutes.

5. A method according to claim 2 including a step of collecting the desorbed contaminant exhausted from the chamber in step iv).

6. A method according to claim 1 wherein the desorption of the contaminant from the carbon cloth material loaded with contaminant in step iii) regenerates the activated carbon cloth material and the regenerated carbon cloth material is employed in steps i) and ii) for adsorption of contaminant from a gaseous stream bearing the contaminant.

7. A method according to claim 1 wherein said heat generated in step iii) is effective to thermally decompose the desorbed contaminant into simple atmospherically dischargeable gases and including a step of discharging said simple gases from said chamber to atmosphere.

8. A method of desorbing a contaminant from a resiliently compressible, electrically conductive, activated carbon cloth material loaded with adsorbed contaminant comprising:
   a) housing said carbon cloth material loaded with adsorbed contaminant in a chamber,
   b) placing said chamber under vacuum,
   c) passing an electric current through said carbon cloth material and generating heat in said carbon cloth material effective to desorb said contaminant from said carbon cloth material, and
   wherein said activated carbon cloth material comrprises a plurality of layers of electrically conductive activated carbon cloth, wherein each layer of said plurality of layers is in electrical contact at least with an adjacent layer of said plurality of layers, and said plurality of layers is disgosed between, and in electrical contact with, first and second spaced apart electrodes; and step c) comprises altering the level of compression of said material to vary the generation of heat to a desired level for desorption of said contaminant from said carbon cloth material.

9. A method according to claim 8 including:
   d) exhausting the desorbed contaminant from said chamber under said vacuum.

10. A method according to claim 8 wherein said vacuum is less than 1.0 torr and said heat generated in step c) is effective to establish a temperature of 300 to 500° C. in said carbon cloth material, and the desorption is completed in 20 to 45 minutes.

11. A method according to claim 8 wherein said heat generated in step c) is effective to thermally decompose the desorbed contaminant into simple atmospherically dischargeable gases and including a step of discharging said simple gases from said chamber to atmosphere.

12. A device for removing a contaminant from a gaseous stream bearing the contaminant comprising:
   a) a chamber housing a resiliently compressible, electrically conductive, activated carbon cloth material;
   b) said chamber housing a first port for introduction into said chamber of a gaseous stream bearing contaminant and a second port for removal from said chamber of the gaseous stream liberated of the contaminant;
   c) a pair of spaced apart electrodes in said housing, said electrodes being electrically in contact with said carbon cloth material for flow of electric current between electrodes and through said carbon cloth material, said carbon cloth material generating heat on passage of said electric current therethrough,
   d) said chamber being gas-tight to support a vacuum therein during the generation of heat by the carbon cloth material, and
   wherein said material comprises a plurality of layers of electrically conductive activated carbon cloth, wherein each layer of said plurality of layers is in electrical contact at least with an adjacent layer of said plurality of layers, and said plurality of layers is disposed between, and in electrical contact with, first and second spaced apart electrodes; and further including means to vary the compression of said material to vary the generation of heat in said material on passage of a constant electric current therethrough to a desired level for desorption of contaminant from the carbon cloth material when loaded with adsorbent contaminant.

13. A device according to claim 12 further including means to establish a vacuum in said chamber.

14. A device for desorbing a contaminant from a resiliently compressible, electrically conductive, activated carbon cloth material loaded with adsorbed contaminant comprising:
   i) a chamber housing said carbon cloth material,
   ii) a pair of spaced apart electrodes in said housing, said electrodes being electrically in contact with said carbon cloth material for flow of electric current between said electrodes and through said carbon cloth material, said carbon cloth material generating heat on passage of said electric current therethrough,
   iii) said chamber being gas-tight to support a vacuum therein during the generation of heat by the carbon cloth material,
   iv) an exhaust port for exhausting under vacuum a contaminant desorbed from the carbon cloth material by the heat generated by the carbon cloth material, and wherein said material comprises a plurality of layers of electrically conductive activated carbon cloth, wherein each layer of said plurality of layers is in electrical contact at least with an adjacent layer of said plurality of layers, and said plurality of layers is disposed between, and in electrical contact with, first and second spaced apart electrodes; and further including means to vary the compression of said material to vary the generation of heat in said material on passage of a constant electric current therethrough to a desired level for desorption of contaminant from the carbon cloth material when loaded with adsorbent contaminant.

15. A device according to claim 14 further including means to establish a vacuum in said chamber.

16. A device according to claim 14 further including container means communicating with said exhaust port for collection of desorbed contaminant.

* * * * *